(No Model.)
D. G. WEEMS.
CARRIER FOR ELECTRIC RAILWAY SYSTEMS.
No. 406,803. Patented July 9, 1889.
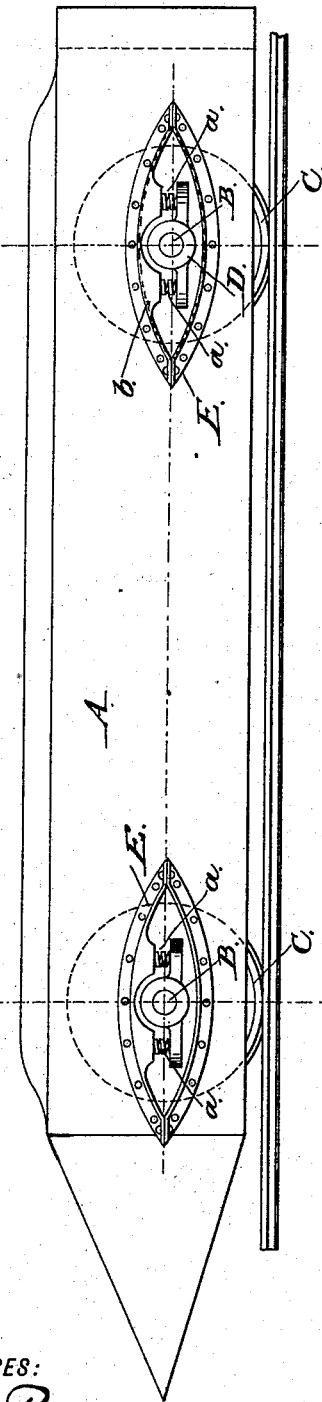
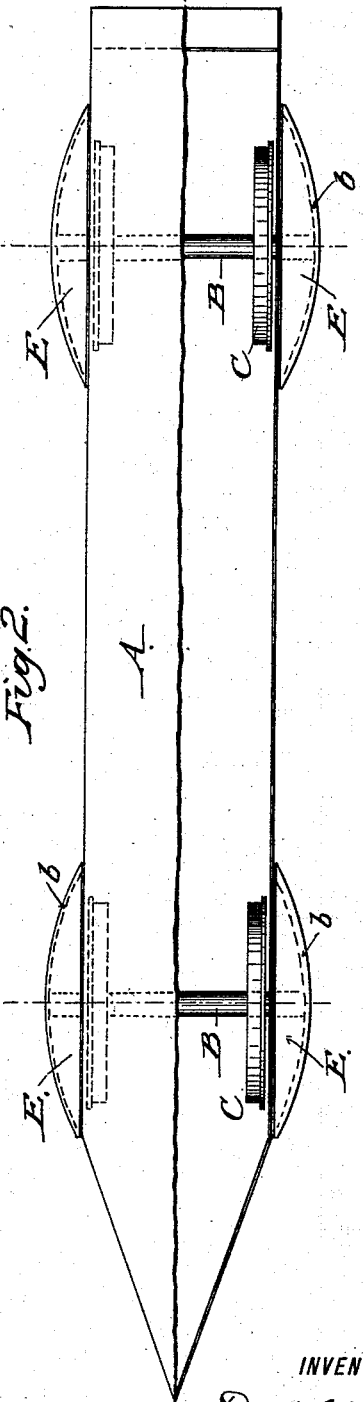
WITNESSES:
INVENTOR
BY
A. H. Evans & Co.
ATTORNEYS

UNITED STATES PATENT OFFICE.

DAVID G. WEEMS, OF BALTIMORE, MARYLAND, ASSIGNOR TO THE ELECTRO-AUTOMATIC TRANSIT COMPANY, OF SAME PLACE.

CARRIER FOR ELECTRIC-RAILWAY SYSTEMS.

SPECIFICATION forming part of Letters Patent No. 406,803, dated July 9, 1889.

Application filed January 30, 1889. Serial No. 298,119. (No model.)

*To all whom it may concern:*

Be it known that I, DAVID G. WEEMS, a citizen of the United States, residing at Baltimore city, State of Maryland, have invented certain new and useful Improvements in Carriers for Electric-Railway Systems, of which the following is a full and clear description, reference being had to the accompanying drawings, forming part of this specification, in which—

Figure 1 represents a side elevation of a car or vehicle embodying my invention. Fig. 2 is a plan view of the same, showing part of the top casing broken away to disclose the main bearing-wheels.

My invention relates to certain new and useful improvements adapted especially to the system for the rapid transportation by electricity of mail and express packages, as disclosed in Letters Patent granted to me January 17, 1888, No. 376,567; and the invention consists, essentially, in providing the cars or carriers with semi-elliptical housings outside of the body of the same for containing the journal-boxes and springs for the main shafts, thereby enabling me to place the main bearing-wheels within the body of the carrier or car, where they are protected from the weather and offer little or no resistance to the rapid travel of the carrier.

The object of my invention is to increase the capacity of the carrier without a corresponding increase in the diameter of the car or its square area and to protect the wheels and journals from the weather and to place them so that they offer but little, if any, resistance to the rapid movements of the train.

In the drawings, A represents the car or carrier with its pointed end, and B B are the shafts of the main bearing-wheels C, said wheels being located inside of the car close to its inner walls, while the ends of the shafts project through said walls and are mounted in journal-boxes D, provided with springs *a*, as shown in Fig. 1. The journal-boxes, with their springs and other conjunctive parts, are mounted and confined in semi-elliptical housings E, bolted to the outer walls of the car, as shown, and provided with face-plates *b*, by means of which the housings are sealed and the journal-boxes, &c., protected from the weather and dirt and other foreign matter. By thus locating the bearings in the exterior housing I increase the internal capacity of the carrier or car by utilizing the space these features formerly occupied, and obtain this result without any corresponding increase of the carrier's square area, and by making the external housings semi-elliptical in shape they offer but little resistance to the air. Therefore the speed of the train is not perceptibly lessened.

Having thus described my invention, what I claim as new, and desire to secure by Letters Patent, is—

1. A car or carrier having closed semi-elliptical housings bolted to its external sides and adapted to contain the journal-boxes for the shafts of the main bearing-wheels.

2. The car or carrier having bearing-wheels within and near the inner walls thereof and the axles for said wheels projecting through the sides of the car or carrier, in combination with closed semi-elliptical housings exterior of the car provided with journal-boxes for the ends of said axles, subtantially as herein described.

DAVID G. WEEMS.

Witnesses:
T. WALTER FOWLER,
W. H. PATTERSON.